Dec. 8, 1925.

A. W. JONES 1,565,012

MANUFACTURE OF WHEELS

Filed Jan. 16, 1925

Inventor
ARTHUR WILLIAM JONES.
By His Attorney

Dec. 8, 1925.  
A. W. JONES  
MANUFACTURE OF WHEELS  
Filed Jan. 16, 1925  
1,565,012  
2 Sheets-Sheet 2

Inventor  
ARTHUR WILLIAM JONES.  
By his Attorney

Patented Dec. 8, 1925.

1,565,012

UNITED STATES PATENT OFFICE.

ARTHUR WILLIAM JONES, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

MANUFACTURE OF WHEELS.

Application filed January 16, 1925. Serial No. 2,920.

*To all whom it may concern:*

Be it known that I, ARTHUR WILLIAM JONES, a subject of the King of Great Britain, and resident of Birmingham, England, have invented certain new and useful Improvements in the Manufacture of Wheels (for which I filed an application in Great Britain on November 16, 1923), of which the following is a specification.

This invention relates to improvements in the manufacture of wheels of the type having a metal rim and a metal felloe and generally known as artillery steel wheels, and wherein flanged sides of the felloe embrace the rim or a portion thereof and are secured thereto for the whole or a portion of their circumference, and is particularly adapted to the manufacture of wheels with rims having a relatively deep central circumferential well or channel, although it may be conveniently used for wheels with other types of rim.

According to this invention I provide a wheel wherein the flanged sides of the felloe are electrically welded to the side or other part of the rim to which it is desired to secure the same. My preferred apparatus for carrying out this invention comprises means wherein the two electrodes essential to the welding operation are in the form of rollers or otherwise, and are adapted to bear upon the exposed surfaces of the rim and of the felloe sides respectively.

The said rollers or other form of electrodes are suitably mounted and means are provided so that the necessary pressure for the welding operation may be exerted thereby. Separate means may be provided to rotate the wheel itself but preferably both the rollers or one of them is rotated by friction when in contact therewith.

The felloe of the wheel is formed of two side plates which are assembled together with and electrically welded to the rim as hereinafter more fully described.

The means above referred to may consist in the apparatus hereinafter described with reference to the accompanying drawings, wherein.

Figure 1:
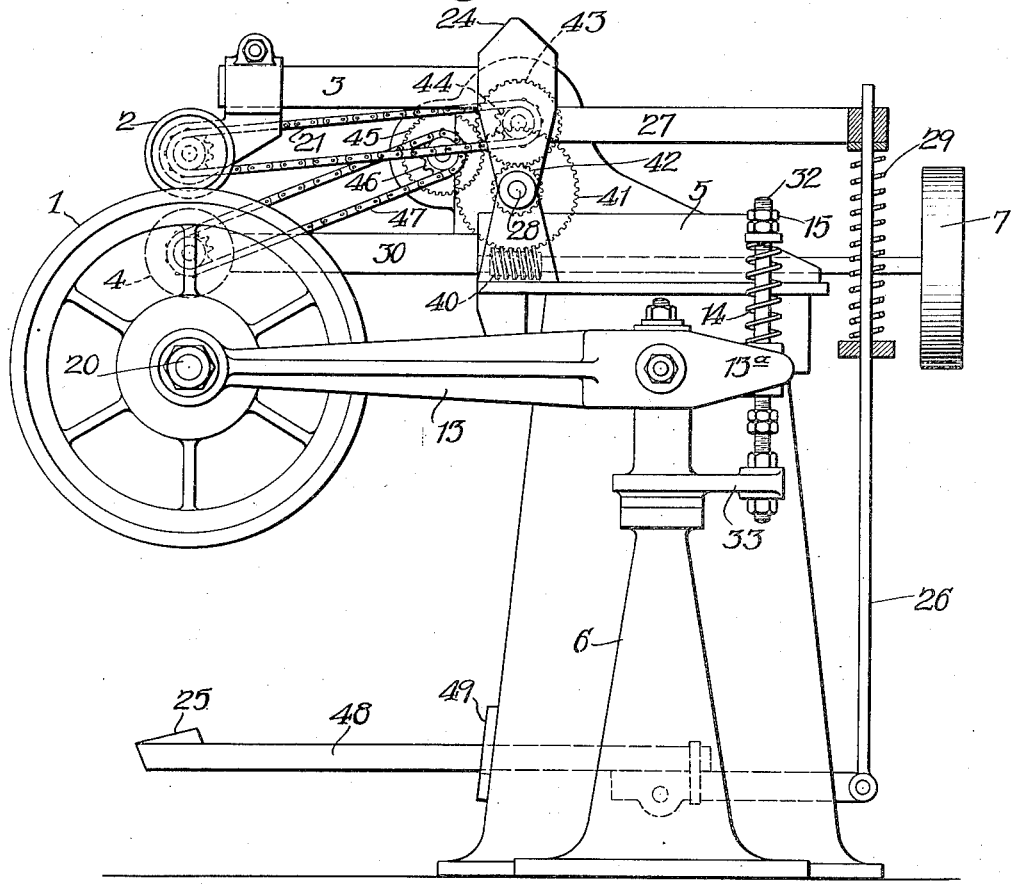
Fig. 1 represents a side elevation of one form of apparatus adapted to carry out the invention.
Figure 2:
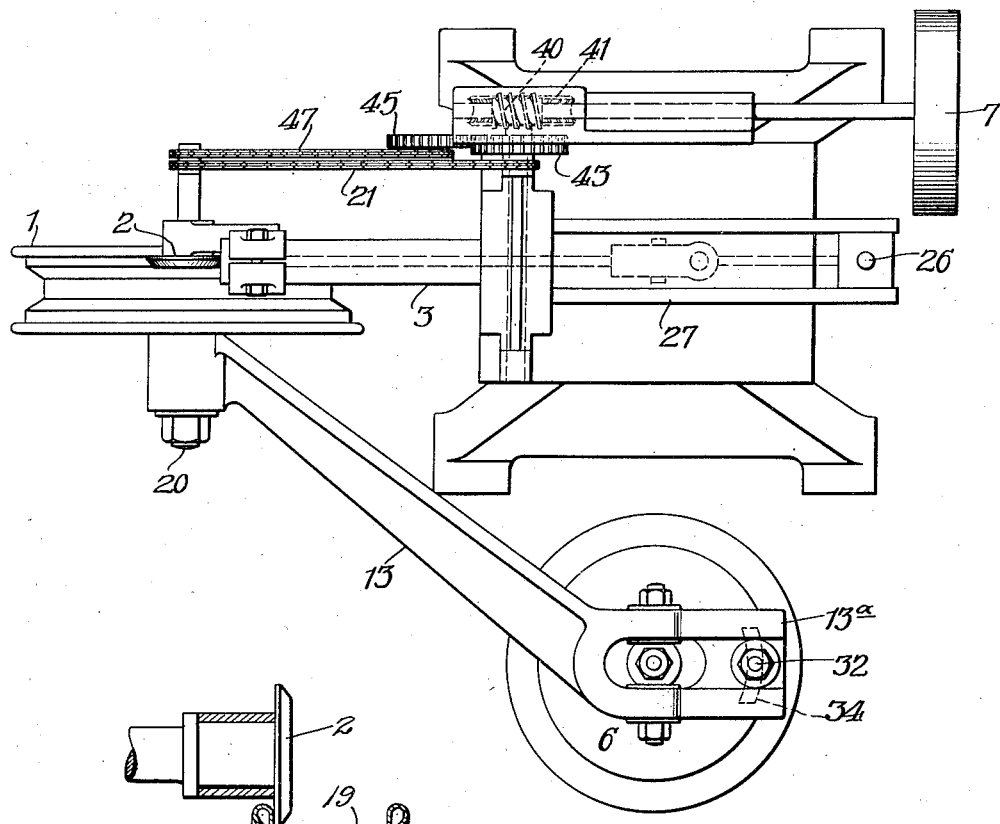
Figure 2 represents a plan view of Fig. 1.
Figure 3:
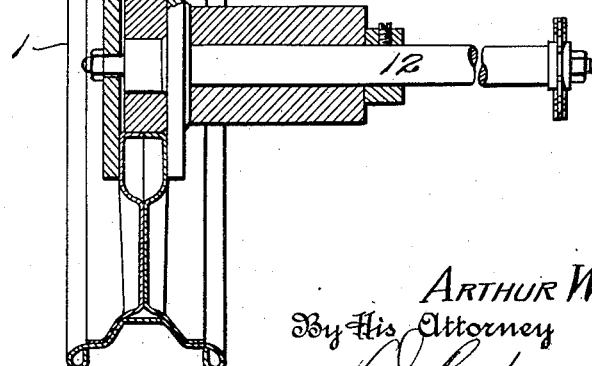
Fig. 3 shows a part of the apparatus with the welding operation in progress.

Referring to Figs. 1 and 2. 1 represents the wheel in position upon the arm 13 so that the roller electrodes 2 and 4 may come into operation so as to weld the side plates of the wheel to the rim. The actual welding operation is shown in more detail in Fig. 5 wherein 17 and 18 are the side plates and 19 is the rim of the wheel. The wheel is free to revolve about the point 20.

The roller electrodes 2 and 4 may preferably be water cooled by known means, but such means are not shown in the drawings. 6 represents the base of the machine and 5 is a welding machine of known type wherein the electric current is transformed or adapted to the purpose required and through which electric current passes to the electrodes 2 and 4. The electric current may be controlled by any known means.

3 is a rocking arm holding the upper electrode 2 and passing through the bridge piece 24. The lower electrode 4 is carried on the arm 30 which is rigidly attached to the body of the machine.

Power is applied to the machine through the pulley 7 and is controlled by known means. When the said pulley rotates its shaft causes the worm 40 and the worm wheel 41 to rotate. The power is then passed through spur gears 42 and 43 and by means of a sprocket 44 and a chain 21 so as to rotate the roller 2. Further gearing consisting of a spur wheel 45 and a sprocket 46 transmits power through a chain 47 to the roller 4 so as to cause the same to rotate. The rollers 2 and 4 rotate in opposite directions and cause the wheel to rotate when in contact therewith.

The foot pedal 25 when depressed raises the rod 26 and compresses the spring 29 so that the end 27 of the arm 3 is raised. The said arm 3 is pivoted about a fulcrum 28 so that the roller electrode 2 is pressed upon the rim when pressure is placed upon the pedal. The lever 48 to which the pedal is attached is engaged with and held against upward movement by the catch 49 so as to retain the roller 2 in position during the welding operation. The spring 29 causes the roller 2 to press upon the wheel until the foot lever 48 is released from the catch when the weight of the members 26, 27 and 29 causes electrode 2 to become disengaged from the rim. If desired, a weight may be attached to the end 27 of the arm 3 so as to augment this action. Such weight, however, is not shown in the drawings.

The projecting portion 13ª of the arm 13 farthest from the wheel bears on one end of a helical compression spring 14 which is retained in position by stud 32 attached to plate 33 which rotates with the arm 13. The weight of the arm and wheel being balanced by the spring 14, a floating action is obtained. The stud 32 travels in a curved slot 34 in the plate 33 so that the arm 13 may be moved about the point 22 clear of the electrodes. The pressure exerted by the said spring may be adjusted by means of the locknuts 15 which can be moved to vary the length thereof.

When the machine is not in operation the lower electrode 4 is not quite in contact with the side plate of the wheel, but when the electrode 2 bears on the wheel, the wheel is at once brought into contact with electrode 4 so as to impart a floating action to the point 20.

When it is desired to weld the wheel, the rim and side plates are assembled and clamped together about the point 20 and the means for rotating the electrodes are put into operation. The foot pedal 25 is then depressed and electric current switched on so that the welding operation is carried out through and by means of the electrodes 2 and 4.

In the construction above described and illustrated in Figs. 1 and 2, both the electrodes 2 and 4 are power driven so as to cause the wheel to rotate. We may, however, if desired drive either one without the other for the above purpose; the electrode which is not driven will be free to rotate. It will be observed that by the arrangement of gearing shown the electrode 2 may be lifted clear of the wheel without the drive being affected.

Though I have described with great particularity of detail certain specific embodiments of my invention, yet it is not to be understood therefrom that the invention is restricted to the particular embodiments disclosed. Various modifications thereof may be made by those skilled in the art without departing from the invention as defined in the following claims.

What I claim is:

1. In the manufacturing of disc wheels, the method which consists in pressing two plates to form a body of such cross-sectional contour that they jointly form a hollow felloe portion, providing a rim having an inner annular projection, assembling the plates on opposite sides of said rim with the projection in engagement with said hollow felloe portion and electrically welding the felloe portion to said rim.

2. In the manufacturing of disc wheels, the method which consists in pressing two plates to jointly form a central body having a felloe portion of approximately U-shape in cross-section with angularly extending flanges at the two extremities of the U-portion, providing a rim and assembling it in engagement with said flanges, and rotating the assemblage while in contact with the electrodes of an electric welding apparatus to form an integral bond between said rim and said flanges.

In witness whereof, I have hereunto signed my name.

ARTHUR WILLIAM JONES.